United States Patent
Coppola et al.

(10) Patent No.: US 12,554,420 B2
(45) Date of Patent: Feb. 17, 2026

(54) POWER MANAGEMENT IN A MEMORY DEVICE BASED ON A HOST DEVICE CONFIGURATION

(71) Applicant: Micron Technology, Inc., Boise, ID (US)

(72) Inventors: Gianluca Coppola, Saviano (IT); Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/436,746

(22) Filed: Feb. 8, 2024

(65) Prior Publication Data

US 2024/0264753 A1    Aug. 8, 2024

Related U.S. Application Data

(60) Provisional application No. 63/483,870, filed on Feb. 8, 2023.

(51) Int. Cl.
*G06F 3/06* (2006.01)

(52) U.S. Cl.
CPC .......... *G06F 3/0625* (2013.01); *G06F 3/0653* (2013.01); *G06F 3/0679* (2013.01)

(58) Field of Classification Search
CPC ..... G06F 3/0625; G06F 3/0653; G06F 3/0679
See application file for complete search history.

(56) References Cited

U.S. PATENT DOCUMENTS

| 2019/0013081 | A1* | 1/2019 | Blodgett | ............... H04L 9/0861 |
| 2019/0050147 | A1* | 2/2019 | Koo | ................... G11C 16/3418 |
| 2024/0139511 | A1* | 5/2024 | Rangaraju | ............ A61B 5/6803 |

* cited by examiner

*Primary Examiner* — Baboucarr Faal
(74) *Attorney, Agent, or Firm* — Harrity & Harrity, LLP

(57) ABSTRACT

In some implementations, a memory device may receive, from a host device, a host configuration that includes an indication of a set of thermal throttling threshold values, wherein the set of thermal throttling threshold values are from a list of sets of valid thermal throttling threshold values. The memory device may send, to the host device, an indication of a set of maximum current consumption values for the memory device, wherein the set of maximum current consumption values is based on the host configuration. The memory device may apply a thermal throttling based on the host configuration.

20 Claims, 4 Drawing Sheets

POWER MANAGEMENT IN A MEMORY DEVICE BASED ON A HOST DEVICE CONFIGURATION

CROSS-REFERENCE TO RELATED APPLICATION

This Patent Application claims priority to U.S. Provisional Patent Application No. 63/483,870, filed on Feb. 8, 2023, and entitled "POWER MANAGEMENT IN A MEMORY DEVICE BASED ON A HOST DEVICE CONFIGURATION." The disclosure of the prior Application is considered part of and is incorporated by reference into this Patent Application.

TECHNICAL FIELD

The present disclosure generally relates to memory devices, memory device operations, and, for example, to power management in a memory device based on a host device configuration.

BACKGROUND

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "PPV," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

DETAILED DESCRIPTION

Figure 1:
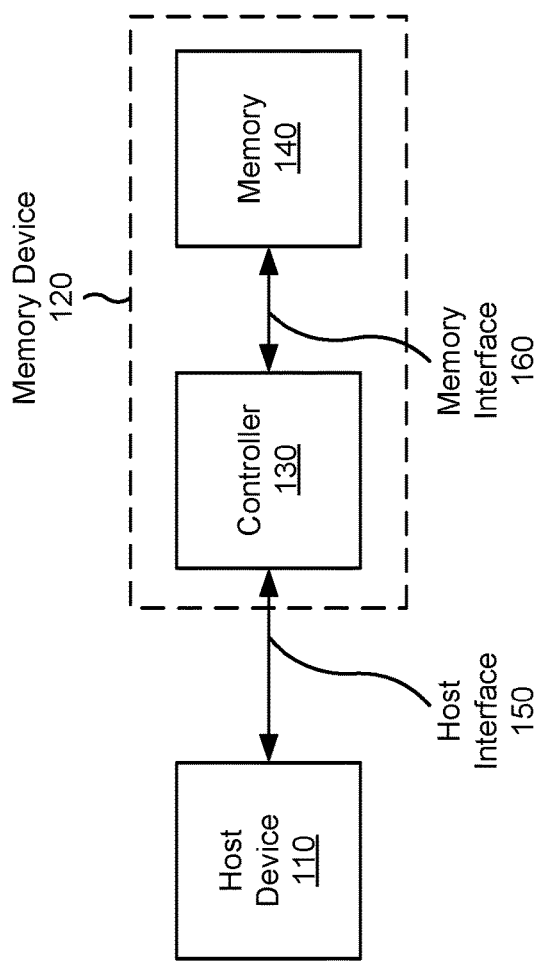
FIG. 1 is a diagram illustrating an example system capable of power management in a memory device based on a host device configuration.

A memory device, such as a managed NAND (mNAND) device, may implement a thermal throttling mechanism to avoid increasing a power consumption of the memory device at relatively high operating temperatures of the memory device. The thermal throttling mechanism may depend on the memory device and/or a firmware implementation (e.g., mNAND firmware that runs on the memory device). The memory device may enter a throttling mode in accordance with the thermal throttling mechanism. During the throttling mode, the memory device may reduce an internal operating frequency and/or an internal parallelism, which may avoid the increase of power consumption at the memory device at the relatively high operating temperatures.

The memory device may periodically capture thermal measurements. A microcontroller of the memory device and/or a memory of the memory device may include a thermal sensor, which may be capable of periodically capturing the thermal measurements. Based on the thermal measurements captured by the thermal sensor, the memory device may throttle a read-write rate (e.g., reduce a read-write rate) to limit the power consumption of the memory device to not exceed a predefined power threshold. The memory device may throttle the read-write rate to limit the power consumption based on the thermal throttling mechanism. As performance demand increases, the required power consumption increases as well, so the memory device may throttle the read-write rate to limit the power consumption on the predefined threshold.

When a thermal measurement exceeds a first temperature threshold value (Tx), the memory device may apply a first level of thermal throttling (e.g., a light thermal throttling to reduce the read-write rate). When the thermal measurement exceeds a second temperature threshold value (Ty), which may exceed the first temperature threshold value (e.g., Ty>Tx), the memory device may apply a second level of thermal throttling (e.g., a heavy thermal throttling), where the second level of thermal throttling may be greater than the first level of thermal throttling. The second level of thermal throttling may be associated with a higher impact on a performance of the memory device as compared to the first level of thermal throttling.

The first temperature threshold value and the second temperature threshold value may be predefined in the memory device. The first temperature threshold value and the second temperature threshold value may not be controlled by a host device, which may be configured to communicate with the memory device. The thermal throttling mechanism may be embedded in the memory device and may not be configurable by the host device.

However, such an approach, in which the thermal throttling mechanism is independent of the host device, may suffer from various disadvantages. Some applications that run on the host device may require higher performance and not have strong limitations on power consumption. Other applications may have strong limitations on power consumption and are able to accept a tradeoff in performance. When the thermal throttling mechanism is fully defined in the memory device, the host device does not have any flexibility to influence the thermal throttling mechanism, and thus the memory device is not adaptable to applications that run on the host device.

In some implementations, a memory device may receive, from a host device, a host configuration that includes an indication of a set of thermal throttling threshold values (e.g., Tx and Ty). The set of thermal throttling threshold values may be from a list of sets of valid thermal throttling threshold values. The host device may select, from the list of sets of valid thermal throttling threshold values, the set of thermal throttling threshold values, and then may indicate the set of thermal throttling threshold values to the memory device. The memory device may send, to the host device, an indication of a set of maximum current consumption values for the memory device. The set of maximum current consumption values may be based on the host configuration. In other words, depending on the set of thermal throttling threshold values indicated to the memory device, the memory device may define the set of maximum current consumption values, and the memory device may indicate the set of maximum current consumption values to the host device. The memory device may apply a thermal throttling based on the host configuration. For example, the memory device may apply the thermal throttling using the set of thermal throttling threshold values, which may be selected by the host device.

In some implementations, a host configurable thermal throttling for power management may be defined, such that a thermal throttling mechanism employed by the memory device may be based on the host configuration. The host configurable thermal throttling for power management may provide flexibility to the host device to use the memory device for an application running on the host device based on performance and power requirements. For example, the host configuration may be defined based on the application requiring a higher performance and not having strong limitations on power consumption. As another example, the host configuration may be defined based on the application having a strong limitation on power consumption and being able to accept a tradeoff in performance. Based on the host configuration, the memory device may apply the thermal throttling, where a first level of thermal throttling (e.g., light thermal throttling) versus a second level of thermal throttling (e.g., heavy thermal throttling) may be configurable by the host device based on a host application design. An operating range or non-operating range of the memory device may be divided into multiple regions (e.g., no thermal throttling, light thermal throttling, and heavy thermal throttling), which may allow maximum control from a user associated with the memory device and/or the host device.

In some cases, more than two levels of throttling may be used. With a host device controlled power management, the host device may obtain the best tradeoff between performance and power consumption based on the host application design, thereby improving a performance of the host device and the memory device.

FIG. 1 is a diagram illustrating an example system 100 capable of power management in a memory device 120 based on a host device configuration. The system 100 may include one or more devices, apparatuses, and/or components for performing operations described herein. For example, the system 100 may include a host device 110 and the memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a universal flash storage (UFS) interface, and/or an eMMC interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, one or more systems, devices, apparatuses, components, and/or controllers of FIG. 1 may be configured to receive a host configuration that includes an indication of a set of thermal throttling threshold values, wherein the set of thermal throttling threshold values are from a list of sets of valid thermal throttling threshold values; send an indication of a set of maximum current consumption values for the memory device, wherein the set of maximum current consumption values is based on the host configuration; and apply a thermal throttling based on the host configuration.

As indicated above, FIG. 1 is provided as an example. Other examples may differ from what is described with regard to FIG. 1.

Figure 2:
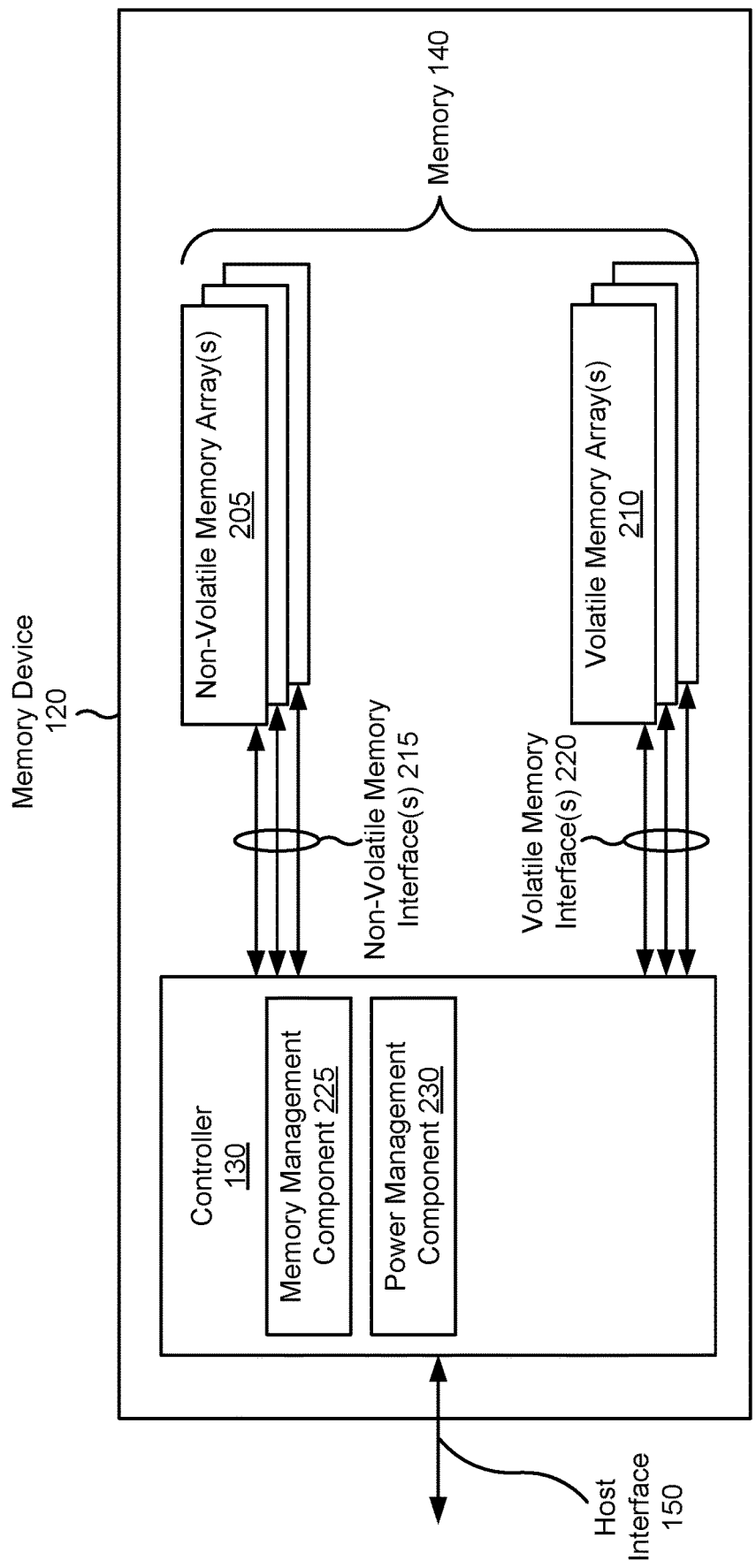
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, and/or a power management component 230. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The power management component 230 may be configured to receive, from the host device 110, a host configuration that includes an indication of a set of thermal throttling threshold values, wherein the set of thermal throttling threshold values are from a list of sets of valid thermal throttling threshold values. The power management component 230 may be configured to send, to the host device 110, an indication of a set of maximum current consumption values for the memory device, wherein the set of maximum current consumption values is based on the host configuration. The power management component 230 may be configured to apply a thermal throttling based on the host configuration.

One or more devices or components shown in FIG. 2 may be configured to perform operations described herein, such as one or more operations and/or methods described in connection with FIGS. 3-4. For example, the controller 130, the memory management component 225, and/or the power management component 230 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
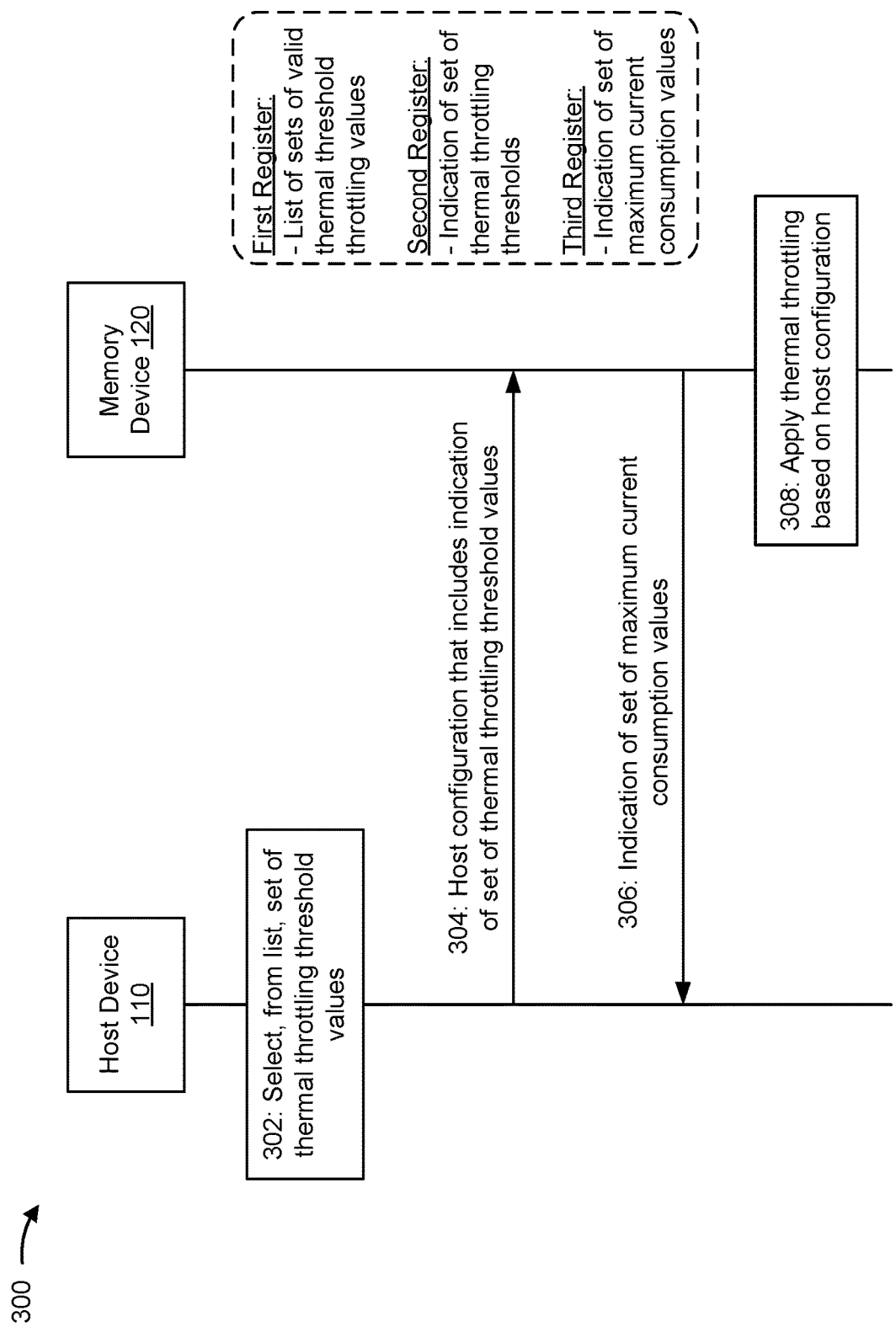
FIG. 3 is a diagram illustrating an example associated with power management in a memory device based on a host device configuration.

FIG. 3 is a diagram of an example 300 of power management in a memory device based on a host device configuration. The operations described in connection with FIG. 3 may be performed by the memory device 120 and/or one or more components of the memory device 120, such as the controller 130 and/or one or more components of the controller 130, and/or the operations described in connection with FIG. 3 may be performed by the host device 110.

In some implementations, the memory device 120 may be a non-volatile memory device, such as an mNAND device or a UFS device. The memory device 120 may be a memory card. In some implementations, the memory device 120 may be associated with an automotive application. In some implementations, the memory device 120 may run mNAND firmware, which may be responsible for power management based on a host device configuration.

As shown by reference number 302, the host device 110 may select, from a list of sets of valid thermal throttling threshold values, a set of thermal throttling threshold values. The set of thermal throttling threshold values may include a first temperature threshold value (Tx) and a second temperature threshold value (Ty). The host device 110 may select the set of thermal throttling threshold values based on performance and power requirements of an application that runs on the host device 110 that uses the memory device 120. The host device 110 may select the set of thermal throttling threshold values based on the application requiring a higher performance and not having strong limitations on power consumption. The host device 110 may select the set of thermal throttling threshold values based on the application having a strong limitation on power consumption and being able to accept a tradeoff in performance.

In some implementations, the list of sets of valid thermal throttling thresholds (e.g., a list of valid Tx/Ty threshold values) may be stored in a first register associated with the memory device 120. The first register may be read-only to the host device 110. In other words, the host device 110 may be unable to change the list of sets of valid thermal throttling thresholds stored in the first register. A set of valid thermal throttling thresholds, from the list of sets of valid thermal throttling thresholds, may be associated with maximum current consumption values (e.g., Iccq and kc values) and performance drop values (e.g., drop_light_performance and drop_heavy_performance values) for the memory device 120.

As an example, the first register may store and provide a list of valid Tx/Ty threshold values versus expected current consumption values versus performance drops in light/heavy thermal throttling. The first register may be read-only by the host device 110. The first register may store a first value (e.g., 00h), which may be associated with Tx0/Ty0 values embedded in the memory device 120 (e.g., the Tx0/Ty0 values may be embedded in an mNAND firmware by default). The first value may be associated with Iccq0/Icc0 maximum current consumption values in a temperature range (e.g., an entire temperature range) associated with the memory device 120. The first value may be associated with a drop0_light_performance value in a light thermal throttling, and a drop0_heavy_performance value in a heavy thermal throttling. The first register may store a second value (e.g., 01h), which may be associated with Tx1/Ty1 values which may be set by the host device 110. The second value may be associated with Iccq1/Icc1 maximum current consumption values in the whole temperature range associated with the memory device 120. The second value may be associated with a drop1_light_performance value in the light thermal throttling, and a drop1_heavy_performance value in the heavy thermal throttling. The first register may store additional values (e.g., 02h), which may be associated with additional Tx/Ty values, additional Iccq/Icc values, and additional drop_light_performance and drop_heavy_performance values.

As shown by reference number 304, the host device 110 may send, to the memory device 120, a host configuration that includes an indication of the set of thermal throttling threshold values (e.g., Tx and Ty values), where the set of thermal throttling threshold values may be from the list of sets of valid thermal throttling threshold values. The set of thermal throttling threshold values may be stored in a second register associated with the memory device 120.

As an example, the host device 110 may configure the second register to store Tx/Ty threshold values. In other words, the Tx/Ty threshold values may be based on a host device 110 setting. The second register may store a first value (e.g., 00h), which may be associated with Tx0/Ty0 values (e.g., default values). The second register may store a second value (e.g., 01h), which may be associated with Tx1/Ty1 values. The second register may store a third value (e.g., 02h), which may be associated with Tx2/Ty2 values. The second register may store additional values (e.g., 03h), which may be associated with additional Tx/Ty values. Depending on a host design, the host device 110 may select one of the valid Tx/Ty values, and the host device 110 may write to the second register to set the Tx/Ty values, which may be configurable by the host device 110. As a result, the host device 110 may be allowed to configure thermal throttling threshold values for the memory device 120.

As shown by reference number 306, the memory device 120 may send, to the host device 110, an indication of a set of maximum current consumption values for the memory device 120. The set of maximum current consumption values may be based on the host configuration. More specifically, the set of maximum current consumption values reported by the memory device 120 may correspond to the set of thermal throttling threshold values configured by the host device 110.

In some implementations, the set of maximum current consumption values for the memory device 120 may be stored in a third register associated with the memory device 120. The third register may be read-only to the host device 110. The set of maximum current consumption values may include a first current threshold value (Iccq) and a second current threshold value (Icc). Thus, the memory device 120 may report the maximum current consumption values based on host-defined thermal throttling threshold values.

As an example, the memory device 120 may inform the host device 110 regarding the maximum current consumption values in the whole temperature range associated with the memory device 120, which may be based on the host configuration. The third register may be read-only by the host device 110. The third register may store a first value (e.g., 00h), which may be associated with Iccq0/Icc0 values (e.g., default values). The third register may store a second value (e.g., 01h), which may be associated with Iccq1/Icc1 values. The second register may store a third value (e.g., 02h), which may be associated with Iccq2/Icc2 values. The second register may store additional values (e.g., 03h), which may be associated with additional maximum current consumption values. After the host configuration, the memory device 120 may update the third register to inform the host device 110 of the maximum current consumption values, which may be based on the host configuration.

In some implementations, the memory device 120 may determine that the set of thermal throttling threshold values indicated by the host device 110 is invalid based on the set of thermal throttling threshold values being absent from the list of sets of valid thermal throttling threshold values. The memory device 120 may compare the set of thermal throttling threshold values with the list of sets of valid thermal throttling threshold values, and based on the comparison, the memory device 120 may determine that the set of thermal throttling threshold values indicated by the host device 110 is invalid. The memory device 120 may send, to the host device 110, an indication that the set of thermal throttling threshold values is invalid. In other words, an error may be reported when the host device 110 attempts to set invalid Tx and Ty values.

In some implementations, the host device 110 may set the second register with a value of "01h". A host setting for the set of thermal throttling threshold values may be "01h", which may be indicated to the memory device 120. The value of "01h" may be associated with a Tx1 value, a Ty1 value, an Iccq1 value, an Icc1 value, a drop1_light_performance value, and a drop1_heavy_performance value (e.g., such values may be predefined for the value of "01h"). In this example, for the value of "01h", the memory device 120 may define the Tx1 value as 70 degrees Celsius, the Ty1 value as 90 degrees Celsius, the Iccq1 value as 1 A, the Icc1 value as 800 mA, the drop1_light_performance value as 10%, and the drop1_heavy_performance value as 30%. Above a temperature Tx=70 degrees Celsius (e.g., when a thermal sensor detects a temperature value that is over 70 degrees Celsius), the memory device 120 may apply a light thermal throttling, which may result in a performance drop of −10% versus operating at room temperature. Above a temperature Ty=90 degrees Celsius (e.g., when a thermal sensor detects a temperature value that is over 90 degrees Celsius), the memory device 120 may apply a heavy thermal throttling, which may result in a performance drop of −30% versus operating at room temperature. Further, the maximum current consumption over the temperature range for the memory device 120 may be Iccq1=1 A and Icc1=800 mA. If the host device 110 were to set the second register with a value of "02h", the memory device 120 may define different values for Tx2, Ty2, Iccq2, Icc2, drop2_light_performance, and drop2_heavy_performance, as compared to the values associated with the value of "01h".

As shown by reference number 308, the memory device 120 may apply a thermal throttling based on the host configuration. The thermal throttling may be associated with a throttling of a read-write rate of the memory device 120 to limit a power consumption associated with the memory device 120. For example, the memory device 120 may decrease the read-write rate of the memory device 120, which may cause the power consumption associated with the memory device 120 to also decrease.

In some implementations, by allowing the host device 110 to configure the thermal throttling thresholds, the host device 110 may obtain a tradeoff between performance and power consumption based on its application design. The host device 110 may be able to define a host controlled power management, which may allow the host device 110 to influence a thermal throttling mechanism that runs on the memory device 120. As a result, the host device 110 may be provided with flexibility to use the memory device 120 in its application based on the performance and power requirements.

As indicated above, FIG. 3 is provided as an example. Other examples may differ from what is described with regard to FIG. 3.

Figure 4:
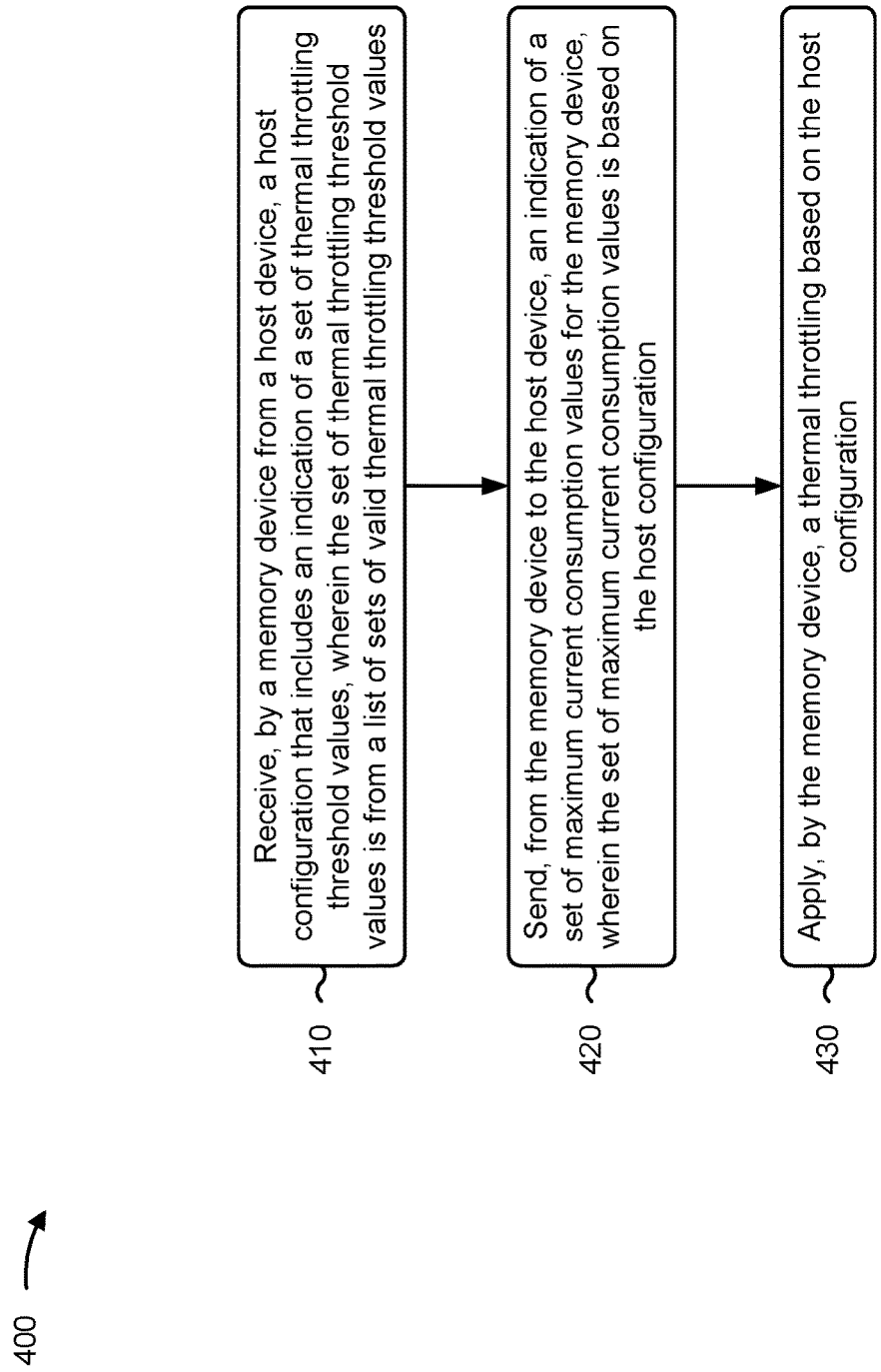
FIG. 4 is a flowchart of an example method associated with power management in a memory device based on a host device configuration.

FIG. 4 is a flowchart of an example method 400 associated with power management in a memory device based on a host device configuration. In some implementations, a memory device (e.g., the memory device 120) may perform or may be configured to perform the method 400. In some implementations, another device or a group of devices separate from or including the memory device (e.g., the system 100) may perform or may be configured to perform the method 400. Additionally, or alternatively, one or more components of the memory device (e.g., the controller 130, the memory management component 225, and/or power management component 230) may perform or may be configured to perform the method 400. Thus, means for performing the method 400 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 400.

As shown in FIG. 4, the method 400 may include receiving, by the memory device from a host device, a host configuration that includes an indication of a set of thermal throttling threshold values, wherein the set of thermal throttling threshold values are from a list of sets of valid thermal throttling threshold values (block 410). As further shown in FIG. 4, the method 400 may include sending, from the memory device to the host device, an indication of a set of maximum current consumption values for the memory device, wherein the set of maximum current consumption values is based on the host configuration (block 420). As further shown in FIG. 4, the method 400 may include applying, by the memory device, a thermal throttling based on the host configuration (block 430).

The method 400 may include additional aspects, such as any single aspect or any combination of aspects described below and/or described in connection with one or more other methods or operations described elsewhere herein.

In a first aspect, the list of sets of valid thermal throttling thresholds is stored in a register associated with the memory device, the register is read-only to the host device, and a set of valid thermal throttling thresholds, from the list of sets of valid thermal throttling thresholds, is associated with maximum current consumption values and performance drop values for the memory device.

In a second aspect, alone or in combination with the first aspect, the set of thermal throttling thresholds is stored in a register associated with the memory device, and the set of thermal throttling thresholds includes a first temperature threshold value and a second temperature threshold value.

In a third aspect, alone or in combination with one or more of the first and second aspects, the set of maximum current consumption values for the memory device is stored in a register associated with the memory device, the register is read-only to the host device, and the set of maximum current consumption values includes a first current threshold value and a second current threshold value.

In a fourth aspect, alone or in combination with one or more of the first through third aspects, method 400 includes determining, by the memory device, that the set of thermal throttling threshold values indicated by the host device is invalid based on the set of thermal throttling threshold values being absent from the list of sets of valid thermal throttling threshold values; and sending, from the memory device to the host device, an indication that the set of thermal throttling threshold values is invalid.

In a fifth aspect, alone or in combination with one or more of the first through fourth aspects, the thermal throttling is associated with a throttling of a read-write rate of the memory device to limit a power consumption associated with the memory device.

In a sixth aspect, alone or in combination with one or more of the first through fifth aspects, the memory device is associated with an automotive application.

In a seventh aspect, alone or in combination with one or more of the first through sixth aspects, the memory device is an mNAND device.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

In some implementations, a memory device includes memory; and a controller configured to: receive, from a host device, a host configuration that includes an indication of a set of thermal throttling threshold values, wherein the set of thermal throttling threshold values are from a list of sets of valid thermal throttling threshold values; send, to the host device, an indication of a set of maximum current consumption values for the memory device, wherein the set of maximum current consumption values is based on the host configuration; and apply a thermal throttling based on the host configuration.

In some implementations, a method includes receiving, by a memory device from a host device, a host configuration that includes an indication of a set of thermal throttling threshold values, wherein the set of thermal throttling threshold values are from a list of sets of valid thermal throttling threshold values; sending, from the memory device to the host device, an indication of a set of maximum current consumption values for the memory device, wherein the set of maximum current consumption values is based on the host configuration; and applying, by the memory device, a thermal throttling based on the host configuration.

In some implementations, a system includes a host device configured to: select, from a list of sets of valid thermal throttling threshold values, a set of thermal throttling threshold values; and send, to a memory device, a host configuration that includes an indication of the set of thermal throttling threshold values; and the memory device configured to: receive, from the host device, the host configuration that includes the indication of the set of thermal throttling threshold values; send, to the host device, an indication of a set of maximum current consumption values for the memory device, wherein the set of maximum current consumption values is based on the host configuration; and apply a thermal throttling based on the host configuration.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   memory; and
   a controller configured to:
      receive, from a host device, a host configuration that includes an indication of a set of temperature threshold values, wherein the set of temperature threshold values is from a list of sets of valid temperature threshold values;
      determine a set of maximum current consumption values for the memory device using another list of valid temperature threshold values versus expected current consumption values;
      send, to the host device, an indication of a set of maximum current consumption values for the memory device; and
      apply a thermal throttling based on the host configuration.

2. The memory device of claim 1, wherein the list of sets of valid temperature threshold values is stored in a register associated with the memory device, wherein the register is read-only to the host device, and wherein a set of valid thermal throttling thresholds, from the list of sets of valid temperature threshold values, is associated with maximum current consumption values and performance drop values for the memory device.

3. The memory device of claim 1, wherein the set of temperature threshold values is stored in a register associated with the memory device, and wherein the set of temperature threshold values includes a first temperature threshold value and a second temperature threshold value.

4. The memory device of claim 1, wherein the set of maximum current consumption values for the memory device is stored in a register associated with the memory device, wherein the register is read-only to the host device, and wherein the set of maximum current consumption values includes a first current threshold value and a second current threshold value.

5. The memory device of claim 1, wherein the controller is further configured to:
   determine that the set of temperature threshold values indicated by the host device is invalid based on the set of temperature threshold values being absent from the list of sets of valid temperature threshold values; and
   send, to the host device, an indication that the set of temperature threshold values is invalid.

6. The memory device of claim 1, wherein the thermal throttling is associated with a throttling of a read-write rate of the memory device to limit a power consumption associated with the memory device.

7. The memory device of claim 1, wherein the memory device is associated with an automotive application.

8. The memory device of claim 1, wherein the memory device is a managed NAND (mNAND) device.

9. A method, comprising:
   receiving, by a memory device from a host device, a host configuration that includes an indication of a set of temperature threshold values, wherein the set of temperature threshold values is from a list of sets of valid temperature threshold values;
   determining a set of maximum current consumption values for the memory device using another list of valid temperature threshold values versus expected current consumption values;
   sending, from the memory device to the host device, an indication of a set of maximum current consumption values for the memory device; and
   applying, by the memory device, a thermal throttling based on the host configuration.

10. The method of claim 9, wherein the list of sets of valid temperature threshold values is stored in a register associated with the memory device, wherein the register is read-only to the host device, and wherein a set of valid temperature threshold values, from the list of sets of valid temperature threshold values, is associated with maximum current consumption values and performance drop values for the memory device.

11. The method of claim 9, wherein the set of temperature threshold values is stored in a register associated with the memory device, and wherein the set of temperature threshold values includes a first temperature threshold value and a second temperature threshold value.

12. The method of claim 9, wherein the set of maximum current consumption values for the memory device is stored in a register associated with the memory device, wherein the register is read-only to the host device, and wherein the set of maximum current consumption values includes a first current threshold value and a second current threshold value.

13. The method of claim 9, further comprising:
   determining, by the memory device, that the set of temperature threshold values indicated by the host device is invalid based on the set of temperature threshold values being absent from the list of sets of valid temperature threshold values; and
   sending, from the memory device to the host device, an indication that the set of temperature threshold values is invalid.

14. The method of claim 9, wherein the thermal throttling is associated with a throttling of a read-write rate of the memory device to limit a power consumption associated with the memory device.

15. The method of claim 9, wherein the memory device is associated with an automotive application.

16. The method of claim 9, wherein the memory device is a managed NAND (mNAND) device.

17. A system, comprising:
   a host device configured to:
      select, from a list of sets of valid temperature threshold values, a set of temperature threshold values; and
      send, to a memory device, a host configuration that includes an indication of the set of temperature threshold values; and
   the memory device configured to:
      receive, from the host device, the host configuration that includes the indication of the set of temperature threshold values;
      determine a set of maximum current consumption values for the memory device using another list of valid temperature threshold values versus expected current consumption values;
      send, to the host device, an indication of a set of maximum current consumption values for the memory device; and
      apply a thermal throttling based on the host configuration.

18. The system of claim 17, wherein the list of sets of valid temperature threshold values is stored in a register associated with the memory device, wherein the register is read-only to the host device, and wherein a set of valid temperature threshold values, from the list of sets of valid temperature threshold values, is associated with maximum current consumption values and performance drop values for the memory device.

19. The system of claim 17, wherein the set of temperature threshold values is stored in a register associated with the memory device, and wherein the set of temperature threshold values includes a first temperature threshold value and a second temperature threshold value.

20. The system of claim 17, wherein the set of maximum current consumption values for the memory device is stored in a register associated with the memory device, wherein the register is read-only to the host device, and wherein the set of maximum current consumption values includes a first current threshold value and a second current threshold value.

* * * * *